US010407329B2

(12) United States Patent
Onodera et al.

(10) Patent No.: US 10,407,329 B2
(45) Date of Patent: Sep. 10, 2019

(54) WASTEWATER TREATMENT SYSTEM AND GAS LIQUID PARTITION VALVE

(71) Applicant: National Institute for Environmental Studies, Tsukuba-shi, Ibaraki (JP)

(72) Inventors: Takashi Onodera, Tsukuba (JP); Kazuaki Syutsubo, Tsukuba (JP); Motoyuki Mizuochi, Tsukuba (JP)

(73) Assignee: National Institute for Environmental Studies, Tsukuba-shi, Ibaraki (JP)

( * ) Notice: Subject to any disclaimer, the term of this patent is extended or adjusted under 35 U.S.C. 154(b) by 0 days.

(21) Appl. No.: 16/069,520

(22) PCT Filed: Jan. 19, 2017

(86) PCT No.: PCT/JP2017/001768
§ 371 (c)(1),
(2) Date: Jul. 12, 2018

(87) PCT Pub. No.: WO2017/126614
PCT Pub. Date: Jul. 27, 2017

(65) Prior Publication Data
US 2019/0031542 A1    Jan. 31, 2019

(30) Foreign Application Priority Data
Jan. 21, 2016  (JP) ................................. 2016-009983

(51) Int. Cl.
C02F 3/28    (2006.01)
C02F 1/66    (2006.01)
C02F 3/34    (2006.01)

(52) U.S. Cl.
CPC .............. *C02F 3/2893* (2013.01); *C02F 1/66* (2013.01); *C02F 3/28* (2013.01); *C02F 3/286* (2013.01); *C02F 3/341* (2013.01); *Y02E 50/343* (2013.01)

(58) Field of Classification Search
CPC ...... C12M 23/36; C12M 23/02; C12M 23/34; Y02E 50/343; C02F 1/66; C02F 3/286; (Continued)

(56) References Cited

U.S. PATENT DOCUMENTS 6,660,518 B1 * 12/2003 Maekawa .............. C12M 21/04
                                                           210/603

FOREIGN PATENT DOCUMENTS

JP    S56-168892    12/1981
JP    S57-026590    2/1982
(Continued)

OTHER PUBLICATIONS

International Search Report dated Mar. 21, 2017 for PCT/JP2017/001768.
(Continued)

*Primary Examiner* — Claire A Norris
(74) *Attorney, Agent, or Firm* — Soei Patent & Law Firm

(57) ABSTRACT

A wastewater treatment system includes: an acid fermentation tank; a methane fermentation tank positioned under the acid fermentation tank, and configured to produce biogas, and an upper portion of the methane fermentation tank including an opening that communicates with the acid fermentation tank; and a gas type liquid partition valve provided at the opening, including a gas storage portion configured to store a predetermined amount of the biogas and discharge the biogas exceeding the predetermined amount to the acid fermentation tank, and configured to block the opening with the biogas stored in the gas storage portion.

18 Claims, 14 Drawing Sheets

(58) Field of Classification Search
CPC . C02F 2203/002; C02F 3/2893; Y02W 30/47;
Y02W 10/12
USPC ...................................... 210/603; 435/300.1
See application file for complete search history.

(56) References Cited

FOREIGN PATENT DOCUMENTS

| | | |
|---|---|---|
| JP | S57-171492 | 10/1982 |
| JP | S58-091500 | 6/1983 |
| JP | S61-138596 | 6/1986 |
| JP | S63-123496 | 5/1988 |
| JP | H11-033584 | 2/1999 |
| JP | 2002-292393 | 10/2002 |

OTHER PUBLICATIONS

International Preliminary Report on Patentability with Written Opinion dated Aug. 2, 2018 for PCT/JP2017/001768.
Extended Search Report in corresponding European Application No. 17741491.9, dated Jun. 28, 2019.

* cited by examiner

WASTEWATER TREATMENT SYSTEM AND GAS LIQUID PARTITION VALVE

CROSS-REFERENCE TO RELATED APPLICATIONS

This application is a U.S. National Phase patent application of PCT Application No. PCT/JP2017/001768, filed Jan. 19, 2017 which claims the benefit of priority from Japanese Patent Application No. 2016-009983, filed Jan. 21, 2016.

TECHNICAL FIELD

This disclosure relates to a wastewater treatment system and a gas type liquid partition valve.

BACKGROUND ART

In Patent Literature 1, a wastewater treatment system in which organic wastewater is treated by an anaerobic treatment is described. The system includes an acid production tank (acid fermentation tank) in which raw wastewater is subjected to an acid fermentation treatment, and a reaction tank (methane fermentation tank) in which the wastewater subjected to the acid fermentation treatment is subjected to pH adjustment by a neutralizer and is then subjected to an anaerobic treatment. By supplying biogas produced in the methane fermentation tank to the acid fermentation tank, the concentration of ammonia, hydrogen sulfide, and hydrogen in the acid fermentation tank can be decreased by a stripping effect of the biogas.

CITATION LIST

Patent Literature

Patent Literature 1: Japanese Unexamined Patent Publication No. 2002-292393

SUMMARY OF INVENTION

Technical Problem

However, the wastewater treatment system described in Patent Literature 1 needs a blower that supplies the biogas and a diffuser pipe. Therefore, electric power is consumed to operate the blower, and the entire system is complex.

Therefore, an object of this disclosure is to provide a wastewater treatment system and a gas type liquid partition valve capable of supplying biogas to an acid fermentation tank with a simple configuration without the need for electric power.

Solution to Problem

A wastewater treatment system includes: an acid fermentation tank configured to produce acid fermentation-treated water by treating raw wastewater with acidogenic bacteria; a first flow path connected to the acid fermentation tank and configured to transmit the acid fermentation-treated water; a methane fermentation tank connected to the first flow path and configured to produce biogas and methane fermentation-treated water by treating acid fermentation-treated water transmitted by the first flow path with methanogenic bacteria, and an upper portion of the methane fermentation tank including an opening that communicates with the acid fermentation tank; a second flow path connected to the methane fermentation tank and configured to transmit the methane fermentation-treated water, and a gas type liquid partition valve provided at the opening, including a gas storage portion configured to store a predetermined amount of the biogas and discharge the biogas exceeding the predetermined amount to the acid fermentation tank, and configured to block the opening with the biogas stored in the gas storage portion.

The wastewater treatment system includes the methane fermentation tank and the acid fermentation tank. In addition, the biogas produced in the methane fermentation tank rises toward the upper portion of the methane fermentation tank, passes through the opening communicating with the acid fermentation tank, and is then stored in the gas storage portion capable of storing the predetermined amount of the biogas. The biogas stored in the gas storage portion blocks the opening of the methane fermentation tank, thereby preventing the raw wastewater or the acid fermentation-treated water in the acid fermentation tank from passing through the opening and flowing into the methane fermentation tank. In addition, the biogas exceeding the predetermined amount in the gas storage portion is discharged to the acid fermentation tank. That is, the biogas produced in the methane fermentation tank does not need an external drive or pipes and is supplied to the acid fermentation tank through the opening and the gas type liquid partition valve provided on the methane fermentation tank. Therefore, in the wastewater treatment system, a blower and a pipe for supplying the biogas are not needed, so that the biogas can be supplied to the acid fermentation tank with a simple configuration without the need for electric power. In addition, the biogas supplied to the acid fermentation tank rises toward the upper portion of the acid fermentation tank. Therefore, the raw wastewater or the acid fermentation-treated water in the acid fermentation tank is stirred by the rising biogas. Accordingly, in the wastewater treatment system, a stirring member for stirring the raw wastewater or the acid fermentation-treated water in the acid fermentation tank is not needed, electric power for driving the stirring member is not needed, and the raw wastewater or the acid fermentation-treated water in the acid fermentation tank can be stirred with no power.

The gas type liquid partition valve may include a case member disposed above the opening to face the opening and including an open bottom portion so as to define the gas storage portion therein; and a guide member defining a flow path through which the biogas flows, including a lower end portion connected to the opening, and at least an upper end portion accommodated inside the case member.

The acid fermentation tank may be an upper stage part in a single tank having an internal space partitioned into upper and lower stages, and the methane fermentation tank may be a lower stage part in the single tank. Accordingly, in the wastewater treatment system, since the acid fermentation tank and the methane fermentation tank are formed inside a single tank, a simpler configuration is achieved.

A gas type liquid partition valve according to this disclosure is a gas type liquid partition valve provided on an opening that communicates with a first space that stores a liquid and with a second space that is positioned under the first space, and is configured to block a flow of the liquid stored in the first space into the second space, and allows gas to pass therethrough from the second space to the first space, the gas type liquid partition valve including: a gas storage portion configured to store a predetermined amount of the gas and discharge the gas exceeding the predetermined amount to the first space, and wherein the opening is blocked by the gas stored in the gas storage portion.

In the gas type liquid partition valve, the gas in the second space passes through the opening and is stored in the gas storage portion capable of storing the predetermined amount of the gas. The gas stored in the gas storage portion blocks the opening, thereby preventing the liquid stored in the first space from passing through the opening and flowing into the second space positioned under the first space. In addition, the gas exceeding the predetermined amount in the gas storage portion is discharged to the first space. That is, the gas in the second space does not need an external drive or pipes and is supplied to the first space through the opening and the gas type liquid partition valve provided under the first space. Therefore, in the gas type liquid partition valve, a blower and a pipe for supplying the gas are not needed, so that the gas can be supplied to the first space with a simple configuration without the need for electric power.

Advantageous Effects of Invention

According to this disclosure, the biogas can be supplied to the acid fermentation tank with a simple configuration without the need for electric power.

DESCRIPTION OF EMBODIMENTS

Figure 1:
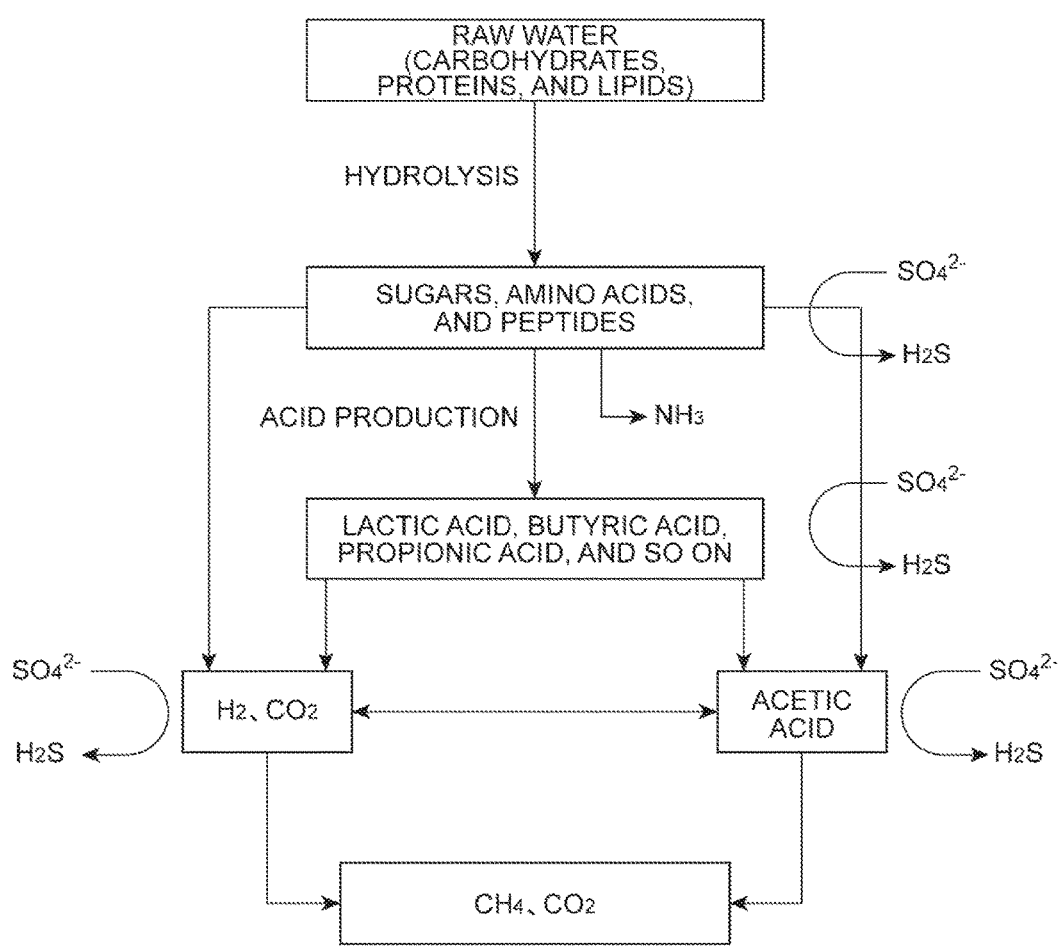
FIG. 1 is a diagram illustrating the principle of an anaerobic treatment.

Hereinafter, embodiments will be described in detail with reference to the drawings. In each of the drawings, like elements which are the same or similar to each other are denoted by like reference numerals, and overlapping descriptions will be omitted.

First Embodiment

A wastewater treatment system according to an embodiment is a system in which organic wastewater is treated by an anaerobic treatment. The anaerobic treatment is a biological treatment method in which organic matter is broken down into methane gas, carbon dioxide, and the like by the metabolism of anaerobic bacteria growing in an anaerobic environment in the absence of oxygen.

FIG. 1 is a diagram illustrating the principle of the anaerobic treatment. As shown in FIG. 1, the anaerobic treatment proceeds in a breakdown pathway of three stages including dissolving and breakdown into smaller molecules through hydrolysis as a first stage, production of volatile fatty acids or alcohols through acid fermentation as a second stage, and production of methane gas as a third stage.

In the first stage, high-molecular-weight organic matter such as carbohydrates, proteins, or lipids contained in raw wastewater is hydrolyzed and broken down into low-molecular-weight organic matter such as sugars, amino acids, or peptides. In the second stage, acids such as lactic acid, butyric acid, or propionic acid is produced from the low-molecular-weight organic matter by the action of acidogenic bacteria, and hydrogen, carbon dioxide, ammonia, and the like are produced. Furthermore, lactic acid, butyric acid, propionic acid, and the like are broken down into acetic acid, and hydrogen, carbon dioxide, and the like are produced. In addition, hydrogen sulfide (sulfide) is produced by the action of sulfate-reducing bacteria. The first step and the second step are carried out in an acid fermentation tank containing at least the acidogenic bacteria. Acidogenic bacteria are anaerobic bacteria that obtain growth energy by producing acids. In the acid fermentation tank, the raw wastewater is treated with the acidogenic bacteria to produce acid fermentation-treated water containing hydrogen, carbon dioxide, and acetic acid. The acid fermentation-treated water is a liquid treated with the acidogenic bacteria. A pH adjuster may be mixed in the acid fermentation tank so as to obtain a pH suitable for the acid fermentation environment.

In the third stage, biogas is produced from the hydrogen, carbon dioxide, acetic acid, and the like contained in the acid fermentation-treated water. Biogas is an organic gas, for example a gas containing methane or carbon dioxide. The third stage is carried out in a methane fermentation tank in which methanogenic bacteria is stored. The methanogenic bacteria are anaerobic bacteria that obtain growth energy by producing methane. In the methane fermentation tank, the acid fermentation-treated water is treated with the methanogenic bacteria to produce biogas and methane fermentation-treated water. The methane fermentation-treated water is a liquid treated with the methanogenic bacteria. In order to hold microorganisms in a methane production tank, granular sludge, dispersed sludge, a fluidized bed, a fixed bed, and the like may be provided in the methane fermentation tank. In the methane fermentation tank, any method may be used regardless of low-temperature methane fermentation, medium-temperature methane fermentation, and high-temperature methane fermentation. A pH adjuster may be mixed in the methane fermentation tank so as to obtain a pH suitable for the methane fermentation environment.

Since the first to third stages described above are carried out as a series of processes, the acid fermentation tank and the methane fermentation tank are connected so that the acid fermentation-treated water flows into the methane fermentation tank from the acid fermentation tank. Hydrogen sulfide, ammonia, and hydrogen produced in the acid fermentation tank described above are inhibitors that inhibit the action of the methanogenic bacteria. Such inhibitors are removed by aerating the acid fermentation-treated water in the acid fermentation tank using the biogas produced in the methane fermentation tank (gas stripping effect). That is, the acid fermentation tank and the methane fermentation tank are connected so that the biogas is supplied from the methane fermentation tank to the acid fermentation tank.

In the wastewater treatment system according to the embodiment, the methane fermentation tank is positioned under the acid fermentation tank, and a gas type liquid partition valve is disposed in the upper portion of the methane fermentation tank. The gas type liquid partition valve operates to allow the biogas produced in the methane fermentation tank to pass therethrough toward the acid fermentation tank provided thereon while not allowing the raw wastewater or the acid fermentation-treated water in the acid fermentation tank to pass therethrough toward the methane fermentation tank positioned thereunder.

Figure 2:
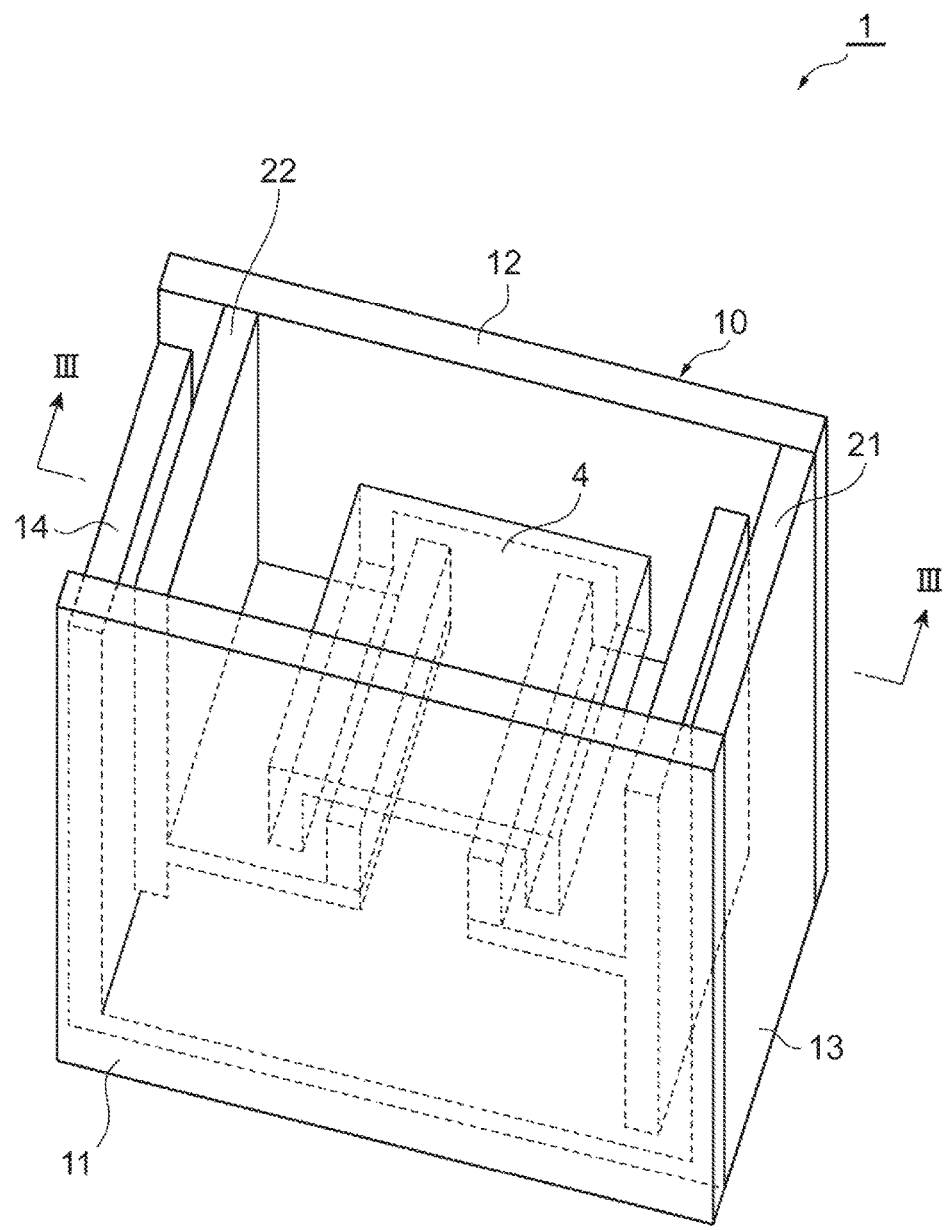
FIG. 2 is a perspective view illustrating the basic configuration of a wastewater treatment system according to an embodiment.
Figure 3:
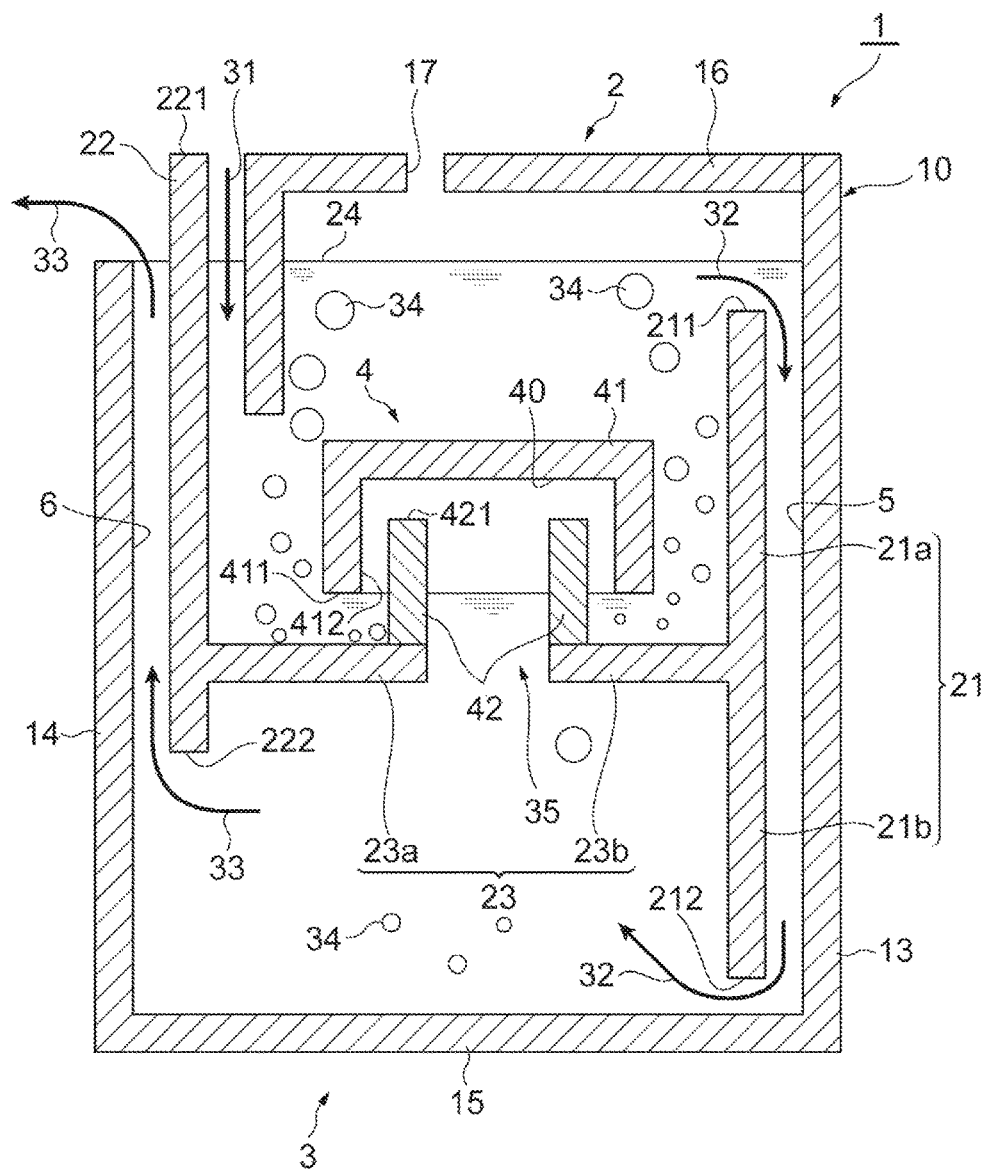
FIG. 3 is a sectional view of the wastewater treatment system taken along the line III-III of FIG. 2.

The principle of the gas type liquid partition valve described above will be described. FIG. 2 is a perspective view illustrating the basic configuration of a wastewater treatment system 1 according to the embodiment, and FIG. 3 is a sectional view of the wastewater treatment system 1 taken along the line H-m of FIG. 2. In order to ensure visibility, a main body upper portion 16, which will be described later, is removed in FIG. 2. As illustrated in FIGS. 2 and 3, a main body 10 of the wastewater treatment system 1 is a single tank having an internal space partitioned into upper and lower stages. An acid fermentation tank 2 is an upper stage part inside the main body, and a methane fermentation tank 3 is a lower stage part inside the main body.

The main body 10 of the wastewater treatment system 1 has a box shape, and the internal space thereof is defined by a front wall 11, a rear wall 12, a right side wall 13, a left side wall 14, a main body bottom portion 15, and the main body upper portion 16. The internal space of the main body 10 is partitioned into a right partition wall 21, a left partition wall 22, and a transverse partition wall 23 into the acid fermentation tank 2 of the upper stage part, the methane fermentation tank 3 of the lower stage part, and an intermediate flow path (first flow path) 5 and a discharge flow path (second flow path) 6 which are positioned on the left and the right of the acid fermentation tank 2 and the methane fermentation tank 3.

Each of the right partition wall 21 and the left partition wall 22 is a partition wall extending in upward and downward directions (vertical direction). The transverse partition wall 23 is a partition wall extending in left and right directions (horizontal direction), and the left and right end portions thereof are respectively connected to the right partition wall 21 and the left partition wall 22. The main body upper portion 16 is a plate-shaped member that covers the upper side of the internal space of the main body 10. The right end portion of the main body upper portion 16 is connected to the right side wall 13. On the other hand, the left end portion of the main body upper portion 16 is disposed away from the left partition wall 22 toward the inside of the main body 10 and protrudes downward to define a flow path into which raw wastewater 31 flows between the main body upper portion 16 and the left partition wall 22. In addition, a gas discharge port 17 is formed in the main body upper portion 16. The acid fermentation tank 2 is made up of the front wall 11, the rear wall 12, an upper half portion 21a of the right partition wall 21, the left partition wall 22, the transverse partition wall 23, and the main body upper portion 16, and a space (first space) is defined therein. In the acid fermentation tank 2, the raw wastewater 31 is treated with acidogenic bacteria to produce acid fermentation-treated water 32. Gas generated in the acid fermentation tank 2 is discharged from the gas discharge port 17.

The right partition wall 21 is disposed away from the right side wall 13 toward the inside of the main body 10. The right partition wall 21 has an upper end portion 211 which is lower than an upper end portion 221 of the left partition wall 22 and has a lower end portion 212 which is lower than a lower end portion 222 of the left partition wall 22, and furthermore, the lower end portion 212 is separated from the main body bottom portion 15. Accordingly, the intermediate flow path 5 which is connected to the acid fermentation tank 2 and transmits the acid fermentation-treated water 32 produced in the acid fermentation tank 2 to the methane fermentation tank 3 is formed. That is, the intermediate flow path 5 is made up of the front wall 11, the rear wall 12, the right partition wall 21, and the right side wall 13, and a space is defined therein. The acid fermentation-treated water 32 produced in the acid fermentation tank 2 passes through the intermediate flow path 5 and flows into the methane fermentation tank 3.

The methane fermentation tank 3 is positioned under the acid fermentation tank 2 and is made up of the front wall 11, the rear wall 12, the left side wall 14, a lower half portion 21b of the right partition wall 21, the transverse partition wall 23, and the main body bottom portion 15, and a space is defined therein. The methane fermentation tank 3 is connected to the intermediate flow path 5 to cause the acid fermentation-treated water 32 transmitted by the intermediate flow path 5 to be treated with methanogenic bacteria such that methane fermentation-treated water 33 and biogas 34 are produced.

The left partition wall 22 is disposed separately from the left side wall 14 toward the inside of the main body 10. The left partition wall 22 has the upper end portion 221 which is higher than the upper end portion 211 of the right partition wall 21 and has the lower end portion 222 which is higher than the lower end portion 212 of the right partition wall 21, and furthermore, the lower end portion 222 is disposed separately from the main body bottom portion 15. Accordingly, the discharge flow path 6 which is connected to the methane fermentation tank 3 and transmits the methane fermentation-treated water 33 produced in the methane fermentation tank 3 is formed. That is, the discharge flow path 6 is made up of the front wall 11, the rear wall 12, the left partition wall 22, and the left side wall 14, and a space is defined therein. The methane fermentation-treated water 33 produced in the methane fermentation tank 3 passes through the discharge flow path 6 and is transmitted to the outside.

In addition, in the transverse partition wall 23 as the upper portion of the methane fermentation tank 3, an opening 35 which communicates with the acid fermentation tank 2 is formed. The transverse partition wall 23 is made up of a first member 23a and a second member 23b which are separated from each other in the left and right direction, and the gap between the first member 23a and the second member 23b becomes the opening 35. The opening 35 allows the biogas 34 produced in the methane fermentation tank 3 to pass therethrough toward the acid fermentation tank 2. A gas type liquid partition valve 4 is disposed above the opening 35.

The gas type liquid partition valve 4 includes a case member 41 and a guide member 42. The case member 41 is disposed above the opening 35 to face the opening 35 and has an open bottom portion so as to define a gas storage portion 40 which is a space capable of accommodating gas therein. Side surfaces of the case member 41 in forward and rearward directions are made up of the front wall 11 and the rear wall 12. The guide member 42 defines therein a flow path through which the biogas 34 flows, and the lower end portion thereof is connected to the opening 35. Side surfaces of the guide member 42 in the forward and rearward direction are made up of the front wall 11 and the rear wall 12. Accordingly, the guide member 42 guides the biogas 34 toward the upper side from the opening 35. In addition, the guide member 42 is disposed such that the outer diameter thereof is smaller than the inner diameter of the case member 41 and an upper end portion 421 thereof is higher than a lower end portion 411 of the case member 41. That is, the guide member 42 is disposed such that at least the upper end portion 421 is accommodated in the case member 41.

The biogas 34 flowing upward from the opening 35 is guided by the guide member 42 and is stored in the gas storage portion 40. The internal pressure of the gas storage portion 40 is balanced with the water pressure by the raw wastewater 31 or the acid fermentation-treated water 32 in the acid fermentation tank 2. Accordingly, the raw wastewater 31 or the acid fermentation-treated water 32 is prevented from flowing into the gas storage portion 40 and the opening 35. That is, the biogas 34 stored in the gas storage portion 40 blocks the opening 35. In addition, in a case where the amount of the biogas 34 stored in the gas storage portion 40 exceeds a predetermined amount, the biogas 34 is discharged toward the acid fermentation tank 2 from a gap 412 between the inner surface of the case member 41 and an outer surface of the guide member 42. As described above, the gas type liquid partition valve 4 operates to allow the biogas 34 produced in the methane fermentation tank 3 to pass therethrough toward the acid fermentation tank 2 provided on the methane fermentation tank 3 while not allowing the raw wastewater 31 or the acid fermentation-treated water 32 in the acid fermentation tank 2 to pass therethrough toward the methane fermentation tank 3 positioned under the acid fermentation tank 2.

Next, the operation of the wastewater treatment system 1 will be described. Here, the acid fermentation tank 2 and the methane fermentation tank 3 are filled with water in advance, and the gas storage portion 40 is in a state in which a predetermined amount of gas is sealed therein. Initially, the raw wastewater 31 flows into the acid fermentation tank 2. Here, since the internal pressure of the gas storage portion 40 is balanced with the water pressure by the raw wastewater 31 or the acid fermentation-treated water 32 in the acid fermentation tank 2, the raw wastewater 31 does not flow from the opening 35 into the methane fermentation tank 3 positioned therebelow. As described above, the gas type liquid partition valve 4 functions as a partition valve that partitions the liquid with gas.

The raw wastewater 31 becomes the acid fermentation-treated water 32 by passing through the first stage and the second stage of the anaerobic treatment described above. In addition, the acid fermentation-treated water 32 passes through the intermediate flow path 5 and flows into the methane fermentation tank 3. In the methane fermentation tank 3, the acid fermentation-treated water 32 flowing thereinto from the intermediate flow path 5 becomes the methane fermentation-treated water 33 by passing through the third stage of the anaerobic treatment described above. The methane fermentation-treated water 33 passes through the discharge flow path 6 and flows out to the outside. As described above, the methane fermentation-treated water 33 is produced from the raw wastewater 31, and purification of the raw wastewater 31 is completed.

Furthermore, in the methane fermentation tank 3, the biogas 34 containing methane and carbon dioxide is produced. The biogas 34 produced in the methane fermentation tank 3 rises toward the opening 35 and reaches the gas storage portion 40. The biogas 34 exceeding the predetermined amount is discharged to the acid fermentation tank 2 and rises toward a liquid surface 24 as bubbles. At this time, inhibitors such as hydrogen sulfide, ammonia, and hydrogen in the acid fermentation tank 2 are discharged as bubbles from the liquid surface 24 by the stripping effect of the biogas 34 discharged (aerated) from the gas type liquid partition valve 4. As described above, the gas type liquid partition valve 4 functions as a valve that causes gas to pass therethrough while partitioning the liquid.

Figure 4:
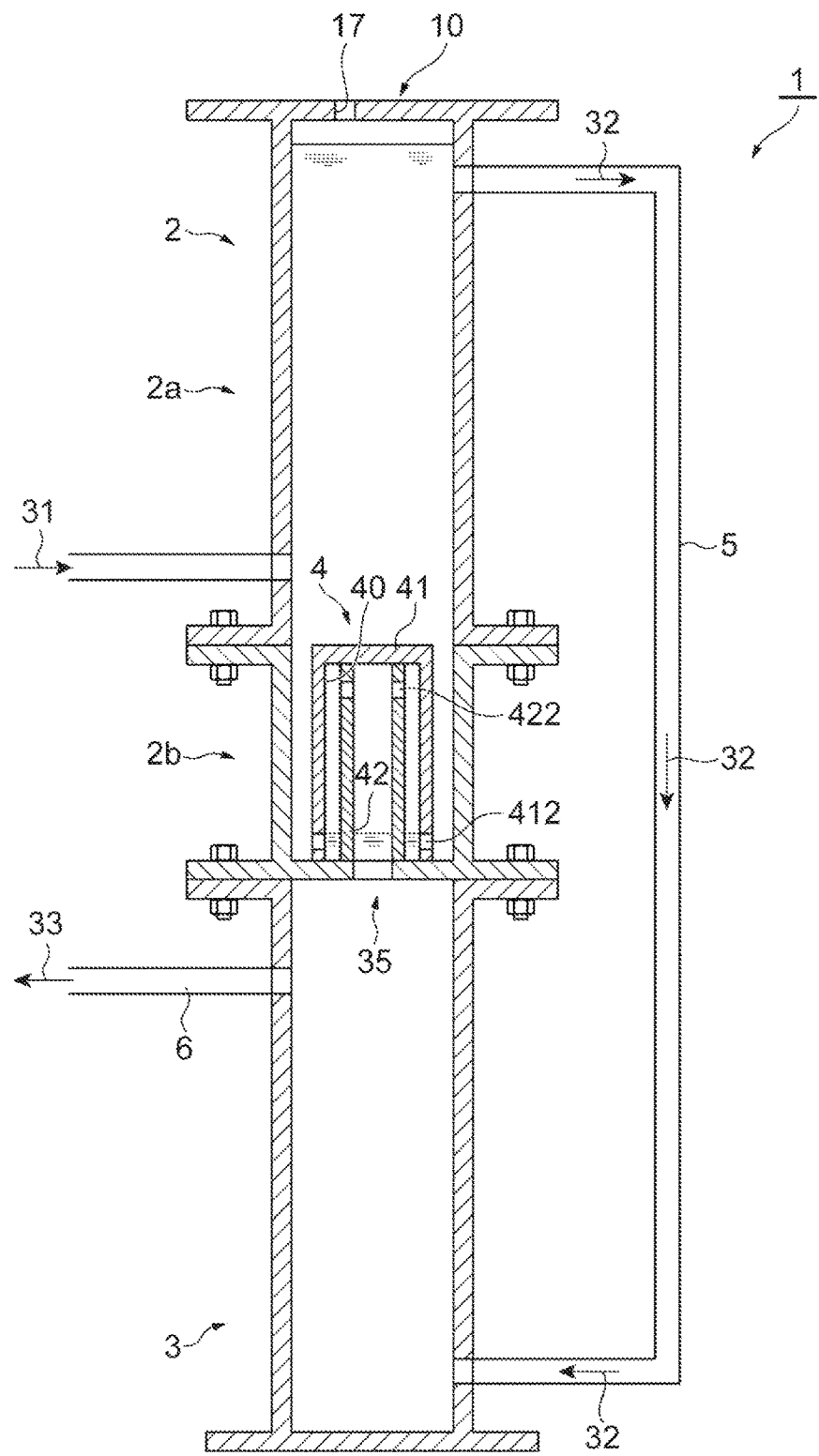
FIG. 4 is a sectional view of the wastewater treatment system according to a first embodiment.

Next, a specific example of the wastewater treatment system 1 having the basic configuration described above will be described. FIG. 4 is a sectional view of the wastewater treatment system according to the first embodiment. The main body 10 of the wastewater treatment system 1 illustrated in FIG. 4 is cylindrical. As illustrated in FIG. 4, the wastewater treatment system 1 includes the acid fermentation tank 2, the methane fermentation tank 3, the gas type liquid partition valve 4, the intermediate flow path 5, and the discharge flow path 6.

The acid fermentation tank 2 is configured by connecting the acid fermentation tank upper portion 2a to the acid fermentation tank lower portion 2b so that the gas type liquid partition valve 4 can be disposed in the acid fermentation tank 2. The acid fermentation tank upper portion 2a and the acid fermentation tank lower portion 2b are cylindrical members each of which has flange portions at both ends and has an open end and a bottom. The acid fermentation tank 2 is configured by connecting the flange portion of the open end portion of the acid fermentation tank upper portion 2a to the flange portion of the open end portion of the acid fermentation tank lower portion 2b with bolts. The acid fermentation tank lower portion 2b has the opening 35 in the bottom portion to allow the biogas 34 produced in the methane fermentation tank 3 to pass therethrough toward the gas type liquid partition valve 4. In the acid fermentation tank 2, the raw wastewater 31 is treated with the acidogenic bacteria to produce the acid fermentation-treated water 32. In addition, in the upper end portion of the acid fermentation tank upper portion 2a, the gas discharge port 17 through which the gas produced in the acid fermentation tank 2 is discharged is formed.

The intermediate flow path 5 is a tubular member and is connected to the acid fermentation tank 2 to transmit the acid fermentation-treated water 32 produced in the acid fermentation tank 2 to the methane fermentation tank 3. That is, the acid fermentation-treated water 32 produced in the acid fermentation tank 2 passes through the intermediate flow path 5 and flows into the methane fermentation tank 3.

The methane fermentation tank 3 is a cylindrical member which has flange portions at both ends and has an open end and a bottom. The methane fermentation tank 3 is configured by connecting the flange portion of the open end of the methane fermentation tank 3 to the flange portion of the bottom portion of the acid fermentation tank lower portion 2b with bolts, so that a space is defined therein. The methane fermentation tank 3 is connected to the intermediate flow path 5 to cause the acid fermentation-treated water 32 transmitted by the intermediate flow path 5 to be treated with the methanogenic bacteria such that the biogas 34 and the methane fermentation-treated water 33.

The discharge flow path 6 is connected to the methane fermentation tank 3, and the methane fermentation-treated water 33 produced in the methane fermentation tank 3 passes through the discharge flow path 6 and is transmitted to the outside.

The gas type liquid partition valve 4 is disposed on the bottom portion of the acid fermentation tank 2, and includes the case member 41 and the guide member 42. The case member 41 is disposed above the opening 35 to face the opening 35, and the bottom portion thereof is open, so that the gas storage portion 40 which is a space capable of accommodating gas therein is defined. The guide member 42 is accommodated in the case member 41, and the lower end portion thereof is connected to the opening 35 so that the inside thereof communicates with the opening 35.

Figure 5:
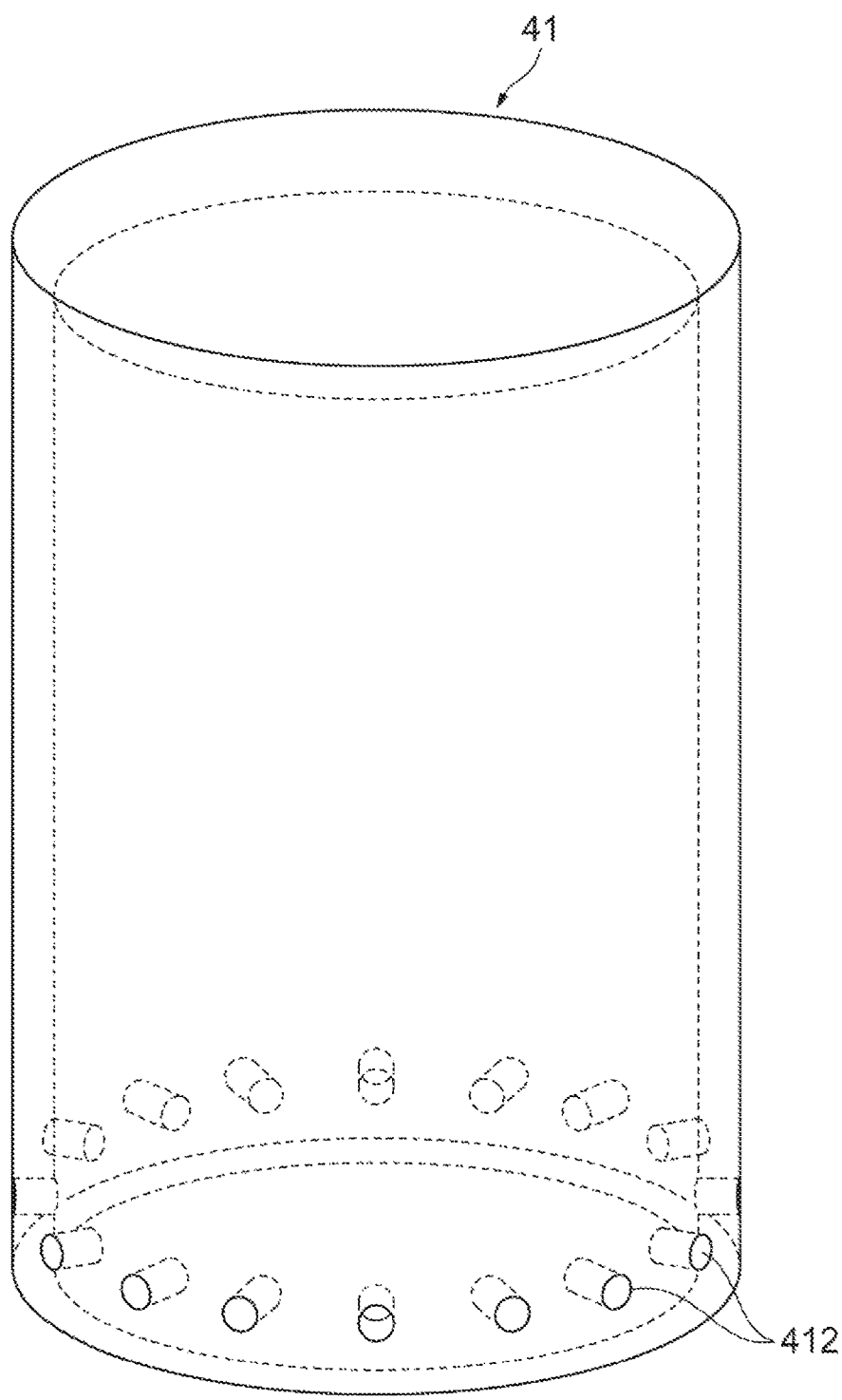
FIG. 5 is a perspective view of a case member illustrated in FIG. 4.
Figure 6:
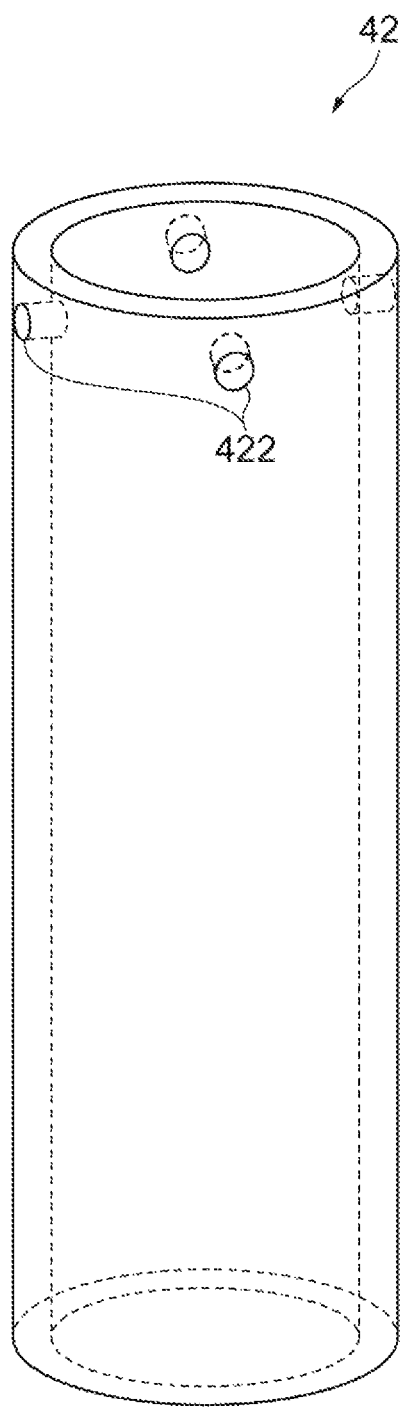
FIG. 6 is a perspective view of a guide member illustrated in FIG. 4.

FIG. 5 is a perspective view of the case member 41 illustrated in FIG. 4. As illustrated in FIG. 5, the case member 41 is a tubular member having an open bottom portion. A plurality of through-holes 413 are arranged in the circumferential direction at the lower side portion of the case member 41. FIG. 6 is a perspective view of the guide member 42 illustrated in FIG. 4. As illustrated in FIG. 6, the guide member 42 is a tubular member having an open upper portion. A plurality of through-holes 422 are arranged in the circumferential direction at the upper side portion of the guide member 42. The outer diameter of the guide member 42 is smaller than the inner diameter of the case member 41 and the height thereof is the same as the length of the inner space of the case member 41 in the upward and downward directions. The upper end portion of the guide member 42 is connected to the inner surface of the upper portion of the inner space of the case member 41. As described above, the guide member 42 is disposed so as to be completely accommodated in the case member 41.

The principle of the gas type liquid partition valve 4 is the same as the basic configuration described above. Specifically, the biogas 34 flowing upward from the opening 35 is output from the through-holes 422 at the upper side portion of the guide member 42 to the gas storage portion 40 defined inside the case member 41 and is stored therein. The internal pressure of the gas storage portion 40 is balanced with the water pressure by the raw wastewater 31 or the acid fermentation-treated water 32. Accordingly, the raw wastewater 31 or the acid fermentation-treated water 32 is prevented from flowing into the gas storage portion 40 and the opening 35. That is, the biogas 34 stored in the gas storage portion 40 blocks the opening 35. In addition, in a case where the amount of the biogas 34 which flows from the opening 35 and is stored in the gas storage portion 40 exceeds the predetermined amount, the biogas 34 is discharged to the acid fermentation tank 2 from the through-holes 413 at the lower side portion of the case member 41. As described above, the gas type liquid partition valve 4 operates to allow the biogas 34 produced in the methane fermentation tank 3 to pass therethrough toward the acid fermentation tank 2 provided on the methane fermentation tank 3 while not allowing the raw wastewater 31 or the acid fermentation-treated water 32 in the acid fermentation tank 2 to pass therethrough toward the methane fermentation tank 3 positioned under the acid fermentation tank 2.

As described above, in the wastewater treatment system 1 according to the first embodiment, the acid fermentation tank 2 and the methane fermentation tank 3 are arranged in the upward and downward directions. In addition, the biogas 34 produced in the methane fermentation tank 3 rises toward the upper portion of the methane fermentation tank 3, passes through the opening 35, and is then stored in the gas storage portion 40. The predetermined amount of the biogas 34 stored in the gas storage portion 40 blocks the opening 35 of the methane fermentation tank 3, thereby preventing the raw wastewater 31 or the acid fermentation-treated water 32 in the acid fermentation tank 2 from passing through the opening 35 and flowing into the methane fermentation tank 3 positioned under the acid fermentation tank 2.

The biogas 34 exceeding the predetermined amount in the gas storage portion 40 is then discharged to the acid fermentation tank 2. That is, the biogas 34 produced in the methane fermentation tank 3 does not need an external drive or pipes and is supplied to the acid fermentation tank 2 through the opening 35 and the gas type liquid partition valve 4 provided on the methane fermentation tank 3. Therefore, in the wastewater treatment system 1 according to the first embodiment, a blower and a pipe for supplying the biogas 34 are not needed, so that the biogas 34 can be supplied to the acid fermentation tank 2 with a simple configuration without the need for electric power. In addition, since the configuration is simplified, the cost of the entire wastewater treatment system 1 can be reduced. In addition, the biogas 34 supplied to the acid fermentation tank 2 rises toward the upper portion of the acid fermentation tank 2. Therefore, the raw wastewater 31 or the acid fermentation-treated water 32 in the acid fermentation tank 2 is stirred by the rising biogas 34. Accordingly, in the wastewater treatment system 1 according to the first embodiment, a stirring member for stirring the raw wastewater 31 or the acid fermentation-treated water 32 in the acid fermentation tank 2 is not needed, electric power for driving the stirring member is not needed, and the raw wastewater 31 or the acid fermentation-treated water 32 in the acid fermentation tank 2 can be stirred with no power.

In addition, in the wastewater treatment system 1 according to the first embodiment, since the acid fermentation tank 2 and the methane fermentation tank 3 are formed inside a single tank, a simple configuration is achieved.

In addition, in the wastewater treatment system 1 according to the first embodiment, the installation space of the system can be reduced compared to a case where the acid fermentation tank 2 and the methane fermentation tank 3 are arranged in the horizontal direction.

Second Embodiment

A wastewater treatment system 1A according to a second embodiment is different from the wastewater treatment system 1 according to the first embodiment only in that a phase separation structure having a plurality of gas type liquid partition valves 4 is provided. In the second embodiment, differences from the wastewater treatment system 1 according to the first embodiment will be mainly described, and overlapping descriptions will be omitted.

Figure 7:
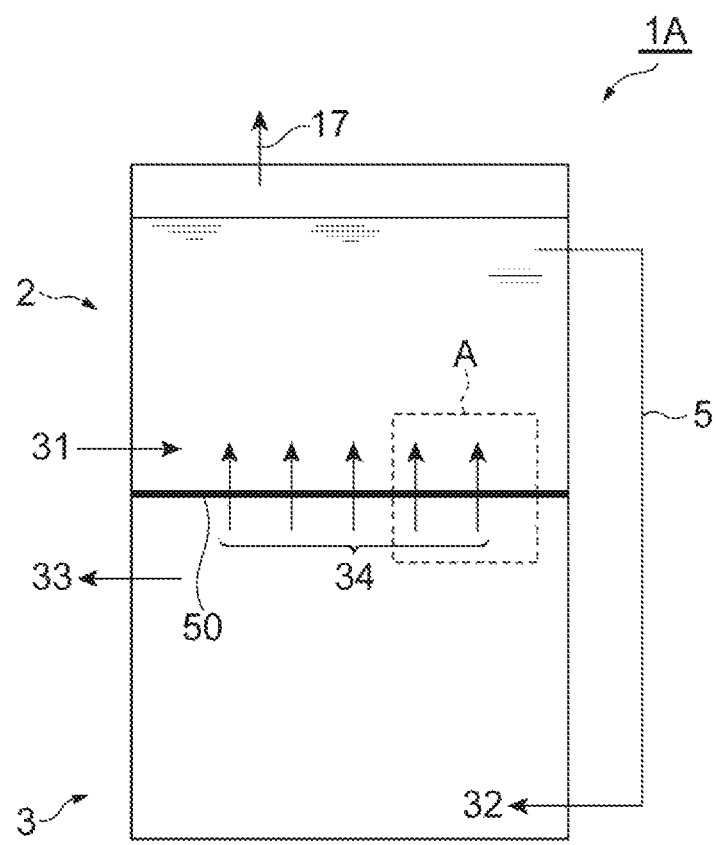
FIG. 7 is a schematic view of a wastewater treatment system according to a second embodiment.
Figure 8:
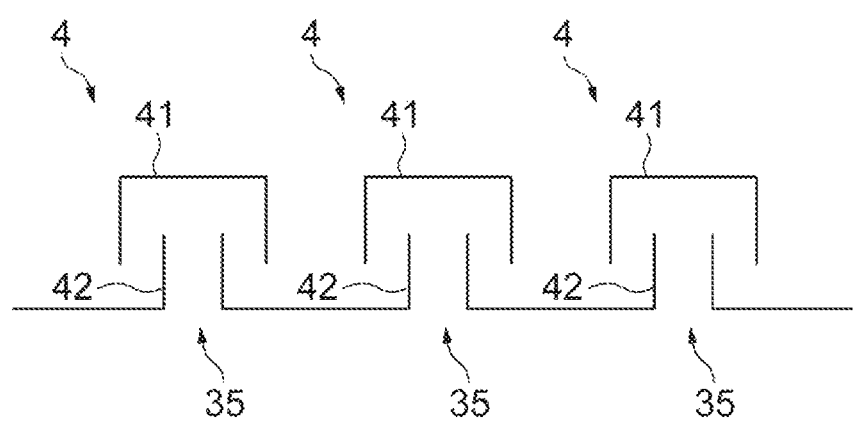
FIG. 8 is a partial enlarged view of a phase separation structure illustrated in FIG. 7.

FIG. 7 is a schematic view of the wastewater treatment system 1A according to the second embodiment. As illustrated in FIG. 7, the wastewater treatment system 1A according to the embodiment includes a phase separation structure 50 having the acid fermentation tank 2, the methane fermentation tank 3, and a plurality of gas type liquid partition valves 4. FIG. 8 is a partial enlarged view of the phase separation structure 50 corresponding to a region indicated by reference numeral A in FIG. 7. As illustrated in FIG. 8, the phase separation structure 50 has a plurality of openings 35. In addition, the phase separation structure 50 includes the gas type liquid partition valves 4 respectively corresponding to the openings 35. The openings 35 may be formed in a line or may be formed in a matrix pattern. Other configurations are the same as those of the wastewater treatment system 1 according to the first embodiment.

Since the wastewater treatment system 1A according to the second embodiment includes the plurality of openings 35 and the plurality of gas type liquid partition valves 4 on the methane fermentation tank 3, the same effects as those of the wastewater treatment system 1 according to the first embodiment are exhibited, and the biogas 34 produced in the methane fermentation tank 3 can be more efficiently supplied to the acid fermentation tank 2 compared to the wastewater treatment system 1 according to the first embodiment.

Third Embodiment

A wastewater treatment system 1B according to a third embodiment is different from the wastewater treatment system 1 according to the first embodiment only in that the methane fermentation tank 3 is not disposed immediately under the acid fermentation tank 2. In the third embodiment, differences from the wastewater treatment system 1 according to the first embodiment will be mainly described, and overlapping descriptions will be omitted.

Figure 9:
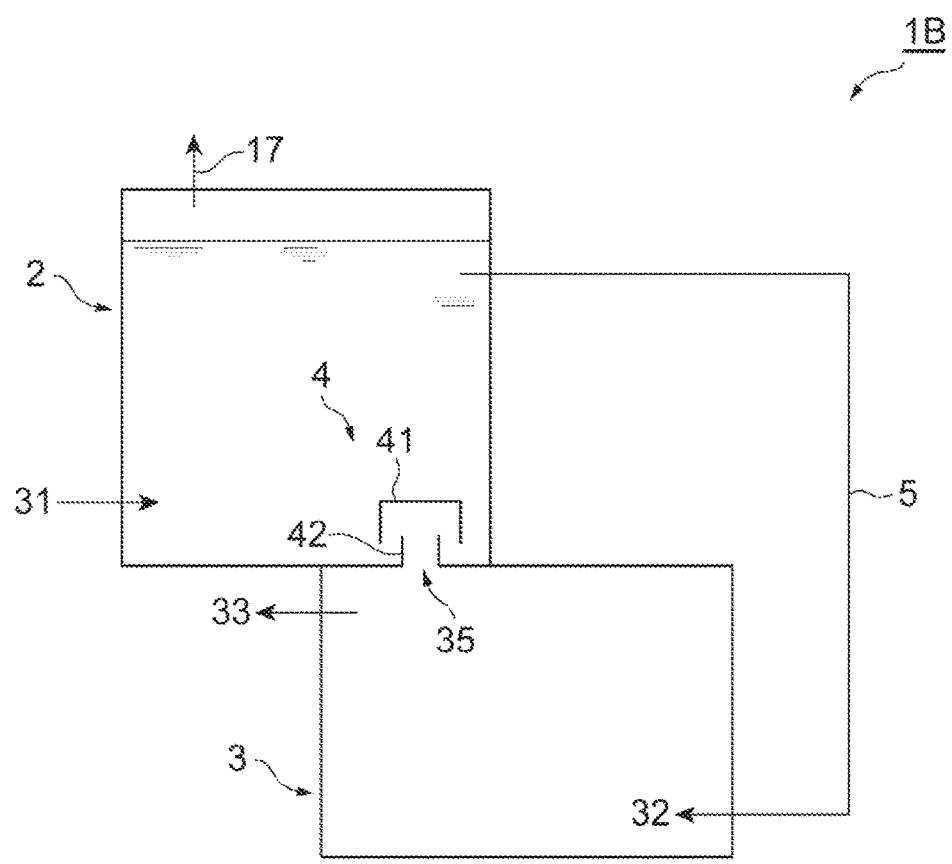
FIG. 9 is a schematic view of a wastewater treatment system according to a third embodiment.

FIG. 9 is a schematic view of the wastewater treatment system 1B according to the third embodiment. As illustrated in FIG. 9, the wastewater treatment system 1B according to the embodiment includes the acid fermentation tank 2, the methane fermentation tank 3, and the gas type liquid partition valve 4. The methane fermentation tank 3 is not disposed immediately under the acid fermentation tank 2 but is disposed so that the upper portion of the methane fermentation tank 3 and the lower portion of the acid fermentation tank 2 partially overlap. In the overlapping portion, the opening 35 and the gas type liquid partition valve 4 are disposed.

Since the methane fermentation tank 3 does not need to be disposed immediately under the acid fermentation tank 2, the wastewater treatment system 1B according to the third embodiment can be applied to various device layouts.

While the embodiments of this disclosure have been described above, this disclosure is not limited to each of the embodiments described above.

Figure 10:
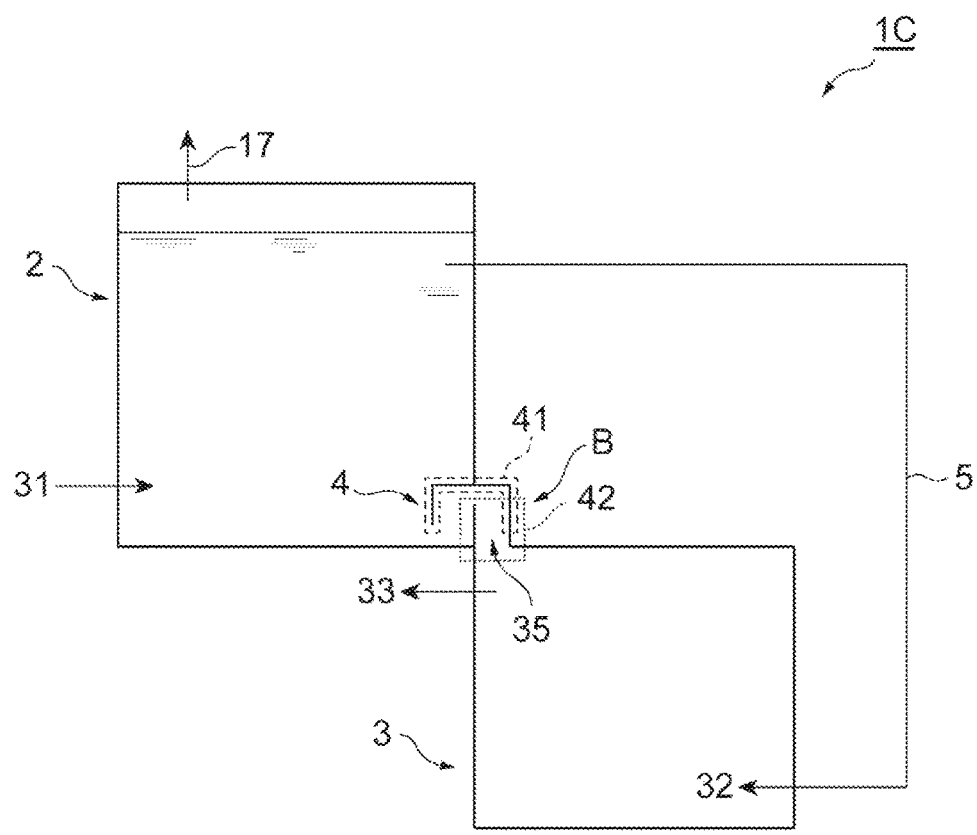
FIG. 10 is a view illustrating a modification example of the wastewater treatment system.

For example, as illustrated in FIG. 10, in the wastewater treatment system 1C, the methane fermentation tank 3 may not be disposed immediately under the acid fermentation tank 2 but may be disposed so that the upper portion of the methane fermentation tank 3 and the lower portion of the acid fermentation tank 2 do not overlap. At this time, as illustrated in B of FIG. 10, the case member 41 and the guide member 42 may be partially shared with each other.

Figure 11:
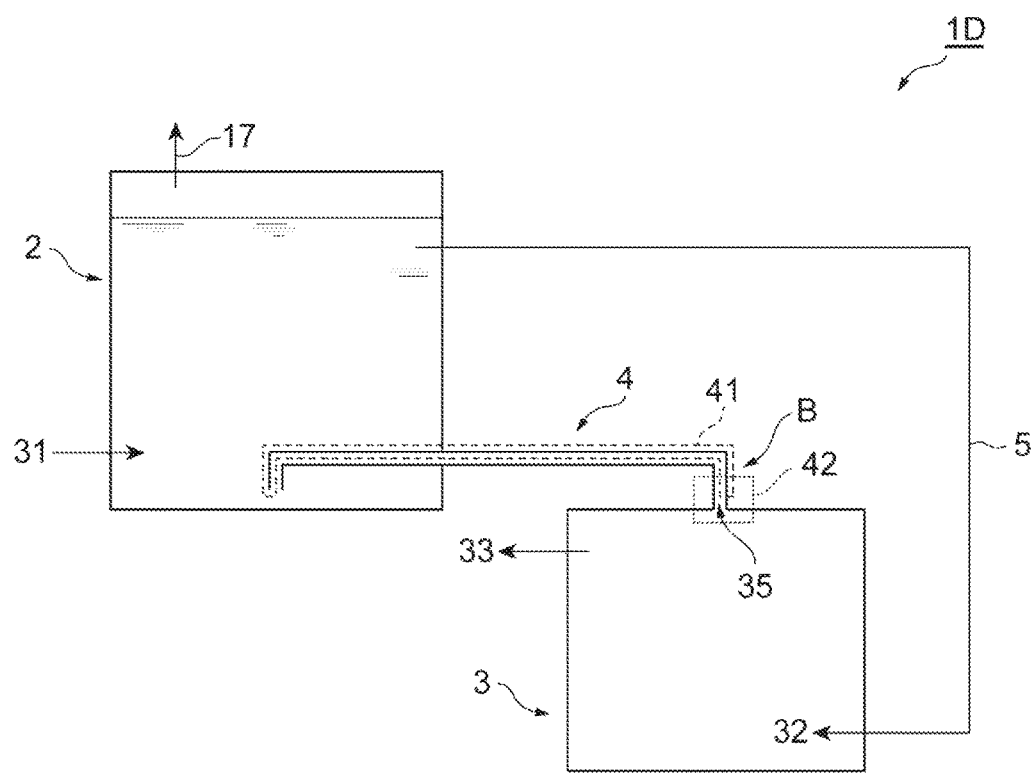
FIG. 11 is a view illustrating a modification example of the wastewater treatment system.

In the embodiment described above, an example in which the bottom portion of the acid fermentation tank 2 is shared with the upper portion of the methane fermentation tank 3 (that is, the wastewater treatment system in which a single tank is partitioned) has been described. However, the acid fermentation tank 2 and the methane fermentation tank 3 may also be formed as separate bodies. Even in this case, the gas type liquid partition valve 4 described above can function. For example, as illustrated in FIG. 11, in a wastewater treatment system 1D, the acid fermentation tank 2 and the methane fermentation tank 3 are formed as separate bodies and are connected to each other by the gas type liquid partition valve 4. At this time, as illustrated in B of FIG. 11, the case member 41 and the guide member 42 may be partially shared with each other.

Figure 12:
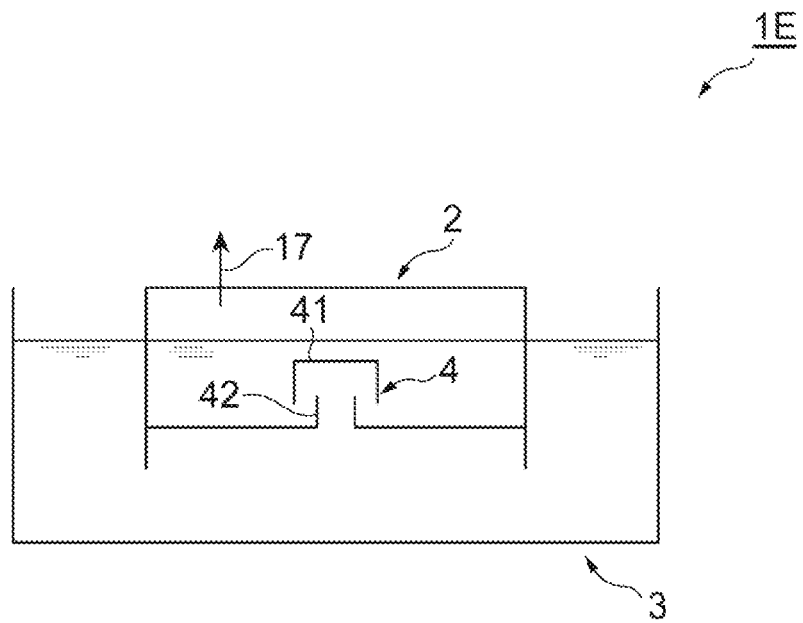
FIG. 12 is a view illustrating a modification example of the wastewater treatment system.

In addition, in the embodiment described above, an example in which the methane fermentation tank 3 is disposed under the acid fermentation tank 2, or an example in which the methane fermentation tank 3 and the acid fermentation tank 2 are formed as separate bodies has been described. However, for example, as illustrated in FIG. 12, in wastewater treatment system 1E, the acid fermentation tank 2 may be disposed inside the methane fermentation tank.

Figure 13:
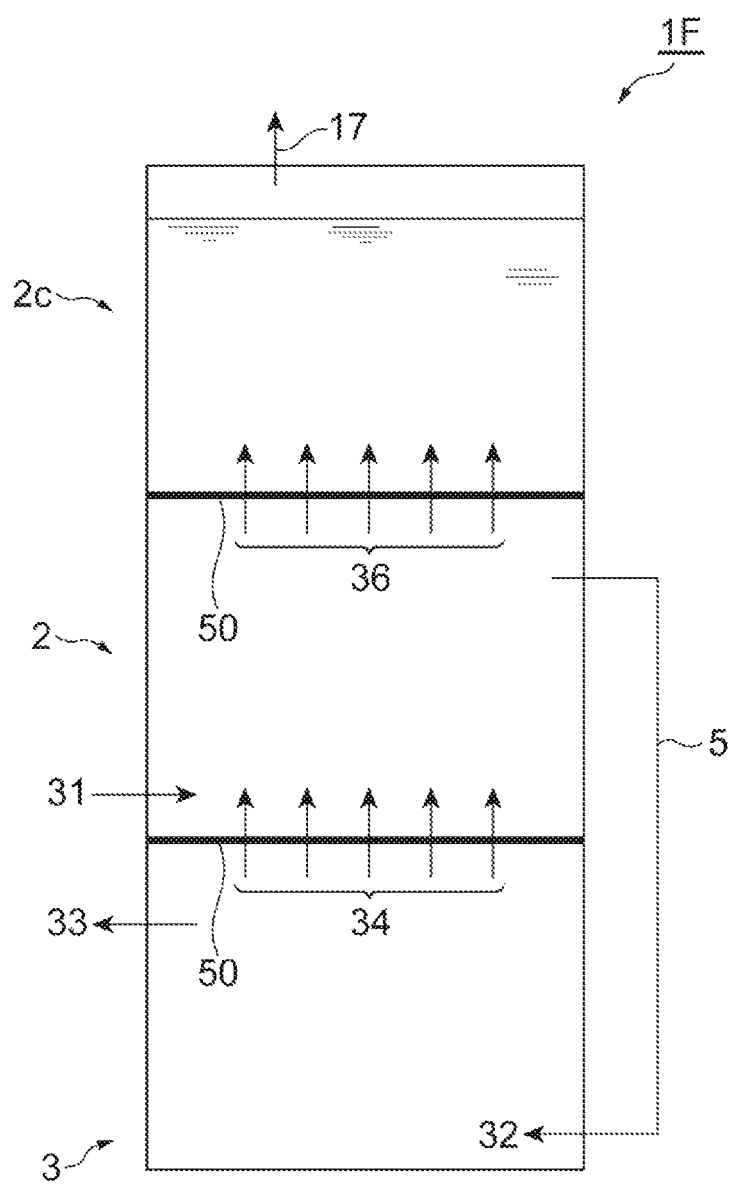
FIG. 13 is a view illustrating a modification example of the wastewater treatment system.

In the embodiment described above, an example in which two tanks including the acid fermentation tank 2 and the methane fermentation tank 3 are provided has been described. However, as illustrated in FIG. 13, a wastewater treatment system 1F may include three tanks by further disposing, for example, a gas absorption tank 2c on the acid fermentation tank 2. At this time, the phase separation structure 50 is also disposed between the gas absorption tank 2c and the acid fermentation tank 2. In the gas absorption tank 2c, for example, a solution containing hydrogen sulfide dissolved therein may be stored. In the phase separation structure 50, biogas 36 containing hydrogen sulfide removed by the stripping effect of the biogas 34 in the acid fermentation tank 2 is caused to pass through the gas absorption tank 2c. Then, hydrogen sulfide and carbon dioxide contained in the biogas 36 are dissolved in the solution, and only methane gas is discharged from the gas absorption tank 2c to be reused. The wastewater treatment system 1F may include three or more tanks.

The structure of the gas type liquid partition valve 4 is not limited to the configuration described above in the first embodiment. The function of the gas type liquid partition valve 4 according to the first embodiment can be exhibited as long as the outlet for outputting from the guide member 42 to the gas storage portion 40 is provided at a position higher than the outlet for outputting from the case member 41 to the acid fermentation tank 2.

In the first embodiment described above, an example in which the case member 41 of the gas type liquid partition valve 4 has a box shape or a cylindrical shape has been described. However, the case member 41 may have a polygonal tube shape and is not limited to any shape as long as the gas storage portion 40 can be defined above the opening 35. Similarly, the shape of the guide member 42 of the gas type liquid partition valve 4 is not limited to a box shape or a cylindrical shape, and may have a flow path formed therein, through which the biogas 34 output from the opening 35 flows.

In the first embodiment described above, an example in which the acid fermentation tank 2 is configured by connecting the acid fermentation tank upper portion 2a and the acid fermentation tank lower portion 2b to each other to enable the gas type liquid partition valve 4 to be disposed inside the acid fermentation tank 2 has been described. However, the acid fermentation tank 2 may not have a divided structure. For example, in a case where the acid fermentation tank 2 is sealed after the gas type liquid partition valve 4 is accommodated in the acid fermentation tank 2, the divided structure is not needed.

By providing a temperature adjustment device (for example, a water jacket) in the periphery of each of the acid fermentation tank 2 and the methane fermentation tank 3, optimal temperature conditions for the acidogenic bacteria and the methanogenic bacteria can be maintained.

Furthermore, the gas type liquid partition valve 4 according to the embodiment described above can also be applied to uses other than the wastewater treatment system. For example, the gas type liquid partition valve 4 can also be used in a case where a storage space (first space) that stores water and a lower space (second space) that is positioned under the storage space are present in an apparatus or an environment in which infiltration of water from the storage space needs to be blocked while allowing gas in the lower space to escape to the storage space. More specifically, the gas type liquid partition valve 4 can be employed by the ceiling of an underwater housing. In addition, the gas type liquid partition valve 4 can also be used as an exhaust gas purification apparatus which purifies exhaust gas by causing the exhaust gas in a lower space to pass through a storage space and thereafter discharges the exhaust gas to the outside air.

EXAMPLES

Hereinafter, examples and comparative examples carried out by the inventors will be described to explain the effects of the gas type liquid partition valve 4 of the wastewater treatment system 1 described above.

Example

The wastewater treatment system 1 illustrated in FIG. 4 was used. As the raw wastewater 31, salt water having a predetermined amount of salt mixed therein was used. Initially, the acid fermentation tank 2 and the methane fermentation tank 3 were filled with water, and air was sealed in the gas storage portion 40 of the gas type liquid partition valve 4. Thereafter, the salt water was supplied to the acid fermentation tank 2, and the salt content of the discharged water discharged through the discharge flow path 6 was measured. The solid content was measured by measuring an electrical conductivity proportional to the salt content.

Comparative Example

The gas type liquid partition valve 4 of the wastewater treatment system 1 illustrated in FIG. 4 was removed. Other conditions were the same as those in the example.

Figure 14:
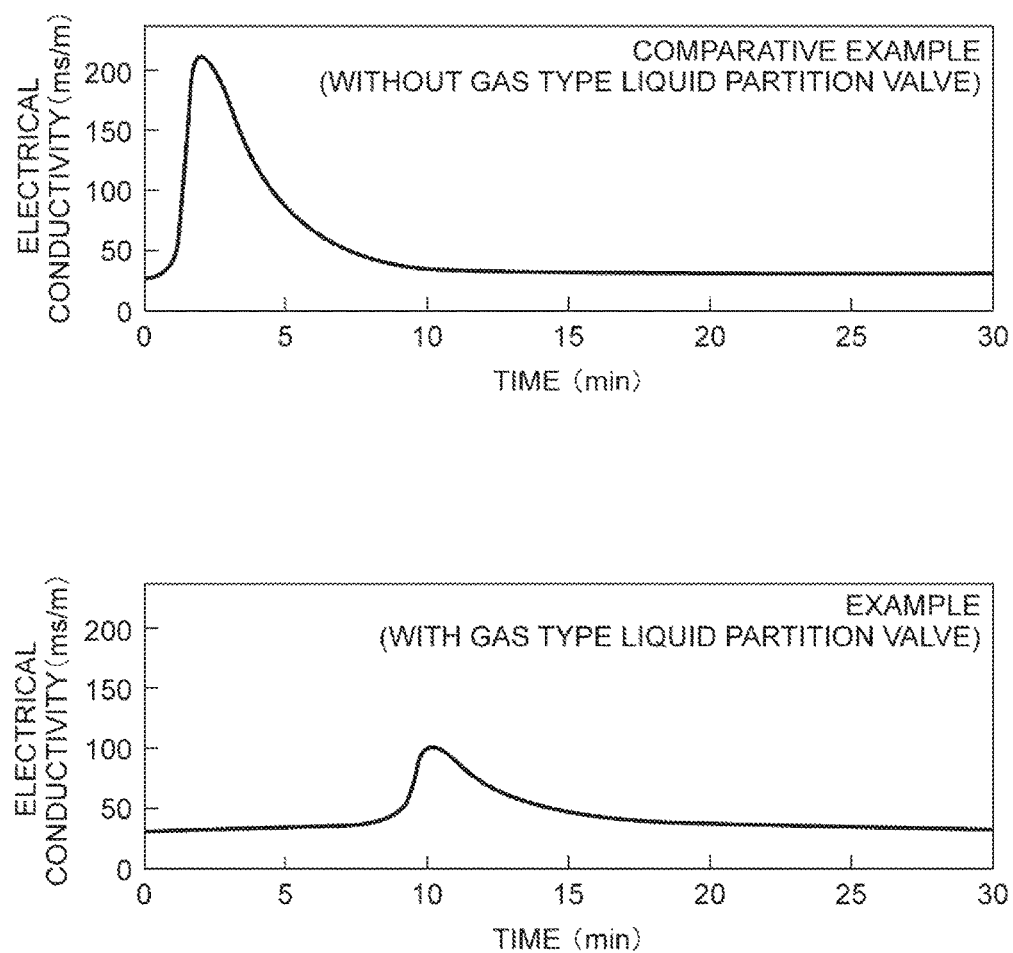
FIG. 14 shows graphs of measurement results of an example and a comparative example.

FIG. 14 shows graphs of the measurement results of the example and the comparative example. The upper graph in FIG. 14 is the graph of the comparative example, the lower graph in FIG. 14 is the graph of the example, the horizontal axis represents the time [min] elapsed from a supply timing of the salt water, and the vertical axis represents the electrical conductivity [ms/s] of the discharged water measured at the downstream of the discharge flow path 6. As shown in FIG. 14, in the comparative example, the electrical conductivity of the discharged water increased immediately after the supply timing of the salt water and reached its peak after about three minutes. This is because since the gas type liquid partition valve 4 was not disposed, the salt water supplied to the acid fermentation tank 2 had passed through the opening 35 and flowed into the methane fermentation tank 3 and was discharged from the discharge flow path 6.

Contrary to this, as shown in the lower graph in FIG. 14, in the example, an increase in the electrical conductivity of the discharged water immediately after the supply timing of the salt water was not confirmed, and the electrical conductivity of the discharged water after about 10 minutes from the supply timing of the salt water reached its peak. This is because the salt water supplied to the acid fermentation tank 2 had passed through the acid fermentation tank 2, the intermediate flow path 5, and the methane fermentation tank 3 in this order and was discharged from the discharge flow path 6. As described above, it was confirmed that the flow of the liquid from the acid fermentation tank 2 into the methane fermentation tank 3 was prevented by the gas type liquid partition valve 4.

INDUSTRIAL APPLICABILITY

The wastewater treatment system 1 can be widely used for wastewater treatments in which an anaerobic treatment is carried out. Specifically, the wastewater treatment system 1 can be used for a wastewater treatment for wastewater containing sulfate, ammonia (protein), and the like. More specific examples of the wastewater containing sulfate include paper pulp wastewater, molasses wastewater, citric acid industrial wastewater, fermentation industrial wastewater (such as alcohol distillery wastewater), and edible oil production wastewater. More specific examples of the wastewater containing ammonia (protein) include livestock excretions (such as pig farm wastewater), a methane fermentation digestive fluid, and potato starch wastewater. Furthermore, the wastewater treatment system 1 can be used for not only the wastewater treatment but also a methane fermentation treatment of liquid waste such as excess sludge and raw garbage. In addition, the wastewater treatment system 1 can be used for not only the methane fermentation treatment but also a wastewater treatment in which an aerobic treatment and an anaerobic treatment are combined. For example, the wastewater treatment system 1 can also be used as a wastewater treatment system in which an anaerobic tank is disposed under an aerobic tank, a treatment by aerobic microorganisms is carried out in the aerobic tank on the upper side by photosynthesis of seaweeds or artificial supply of oxygen, and an anaerobic treatment is carried out in the anaerobic tank on the lower side. Furthermore, the wastewater treatment system 1 can also be used for purification of biogas using not only the gas stripping but also gas absorption (removal of hydrogen sulfide, carbon dioxide gas, ammonia gas, and the like). In addition, the wastewater treatment system 1 can also be used for absorption of gas components produced from water ponds in which wastewater is stored, and water systems such as lakes, rivers, and oceans in the natural environment. In addition, it is possible to absorb or break down the absorbed gas using chemicals, microorganisms, or the like.

REFERENCE SIGNS LIST 1, 1A, 1B: wastewater treatment system, 2: acid fermentation tank, 3: methane fermentation tank, 4: gas type liquid partition valve, 5: intermediate flow path (first flow path), 6: discharge flow path (second flow path), 35: opening, 40: gas storage portion, 41: case member, 42: guide member.

The invention claimed is:

1. A wastewater treatment system comprising:
a wastewater treatment container partitioned into an upper stage and a lower stage, both the upper stage and the lower stage being formed, in part, by a sidewall of the wastewater treatment container;
an acid fermentation tank located in the upper stage of the wastewater treatment container and configured to produce acid fermentation-treated water by treating raw wastewater with acidogenic bacteria;
a first flow path located within the wastewater treatment container and configured to transmit the acid fermentation-treated water from the upper stage to the lower stage;
a methane fermentation tank located in the lower stage of the wastewater treatment container and positioned under the acid fermentation tank, connected to the acid fermentation tank via the first flow path, and configured to produce biogas and methane fermentation-treated water by treating the acid fermentation-treated water transmitted by the first flow path with methanogenic bacteria, wherein an upper portion of the methane fermentation tank includes an opening that communicates with the acid fermentation tank;

a second flow path connected to the methane fermentation tank and configured to transmit the methane fermentation-treated water; and a gas type liquid partition valve provided at the opening, including a gas storage portion configured to store a predetermined amount of the biogas and discharge the biogas exceeding the predetermined amount to the acid fermentation tank, and further configured to block the opening with the biogas stored in the gas storage portion.

2. The wastewater treatment system according to claim 1, wherein the gas type liquid partition valve includes:

a case member disposed above the opening to face the opening and including an open bottom portion so as to define the gas storage portion therein; and a guide member defining a flow path through which the biogas flows, including a lower end portion connected to the opening, and at least an upper end portion accommodated inside the case member.

3. The wastewater treatment system according to claim 1, wherein the first flow path is located adjacent the sidewall of the wastewater treatment container.

4. The wastewater treatment system according to claim 3, wherein the first flow path fluidly couples the acid fermentation tank to the methane fermentation tank via a channel formed between the sidewall and an inner partition which extends from the upper stage to the lower stage of the wastewater treatment container.

5. The wastewater treatment system according to claim 4, wherein the second flow path is located within the wastewater treatment container.

6. The wastewater treatment system according to claim 5, wherein the second flow path is located adjacent a second sidewall of the wastewater treatment container.

7. The wastewater treatment system according to claim 6, wherein the second flow path fluidly couples the methane fermentation tank to an outlet of the wastewater treatment container via a second channel formed between the second sidewall and a second inner partition of the wastewater treatment container.

8. The wastewater treatment system according to claim 7, wherein the inner partition has an upper end portion located in the upper stage which is lower than an upper end portion of the second inner partition, and wherein the inner partition has a lower end portion located in the lower stage which is lower than a lower end portion of the second inner partition.

9. A wastewater treatment system comprising:

a wastewater treatment container partitioned into a first stage and a second stage;

an acid fermentation tank located in the first stage of the wastewater treatment container and configured to process wastewater with acidogenic bacteria;

a methane fermentation tank located in the second stage of the wastewater treatment container and configured to process the wastewater with methanogenic bacteria;

a flow path located within the wastewater treatment container and fluidly coupling the acid fermentation tank to the methane fermentation tank so that the wastewater may be sequentially treated with the acidogenic bacteria and with the methanogenic bacteria; and a gas type liquid partition valve provided at an opening between the first stage and the second stage of the wastewater treatment container, the gas type liquid partition valve configured to allow biogas to pass through the opening and to prohibit liquid from passing through the opening, wherein the acid fermentation tank is at least partially located above the methane fermentation tank in relationship with an upper portion and a lower portion of the wastewater treatment container.

10. The wastewater treatment system according to claim 9, wherein the gas type liquid partition valve includes a gas storage portion configured to:
store a predetermined amount of the biogas;
discharge the biogas exceeding the predetermined amount; and
block the opening with the biogas stored in the gas storage portion.

11. The wastewater treatment system according to claim 9, wherein both the first stage and the second stage are formed, in part, by a sidewall of the wastewater treatment container, and wherein the flow path is located adjacent the sidewall.

12. The wastewater treatment system according to claim 11, further comprising a second flow path located within the wastewater treatment container and adjacent a second sidewall of the wastewater treatment container, wherein the second flow path is configured to transmit the waste water which has been treated with both the acidogenic bacteria and with the methanogenic bacteria to a discharge port of the wastewater treatment container.

13. The wastewater treatment system according to claim 9, wherein the first stage and the second stage are vertically aligned with each other in relationship with the upper portion and the lower portion of the wastewater treatment container.

14. The wastewater treatment system according to claim 13, wherein the methane fermentation tank is located in the lower portion of the wastewater treatment container.

15. The wastewater treatment system according to claim 9, wherein a plurality of gas type liquid partition valves are provided at a plurality of openings between the first stage and the second stage of the wastewater treatment container to distribute the biogas that passes between the first stage and the second stage.

16. The wastewater treatment system according to claim 15, wherein the plurality of openings is formed in a line pattern or in a matrix pattern.

17. The wastewater treatment system according to claim 9, further comprising a temperature adjustment device located in a periphery of the wastewater treatment container to maintain a predetermined temperature associated with the acidogenic bacteria or the methanogenic bacteria.

18. A wastewater treatment system comprising:

a wastewater treatment container partitioned into an upper stage and a lower stage;

an acid fermentation tank located in the upper stage of the wastewater treatment container and configured to process wastewater with acidogenie bacteria;

a methane fermentation tank located in the lower stage of the wastewater treatment container and configured to process the wastewater with methanogenic bacteria;

a flow path fluidly coupling the acid fermentation tank to the methane fermentation tank so that the wastewater may be sequentially treated with the acidogenic bacteria and with the methanogenic bacteria; and a gas type liquid partition valve provided at an opening between the upper stage and the lower stage of the wastewater treatment container, the gas type liquid partition valve configured to allow biogas to pass through the opening and to prohibit liquid from passing through the opening.

* * * * *